United States Patent [19]

Conway et al.

[11] Patent Number: 5,859,094
[45] Date of Patent: Jan. 12, 1999

[54] USE OF HIGH MOLECULAR WEIGHT ORGANOPOLYSILOXANES TO IMPROVE PHYSICAL PROPERTIES OF LIQUID SILICONE RUBBER COMPOSITIONS

[75] Inventors: Lori Jean Conway, Midland, Mich.; Phillip Joseph Griffith, Llandough, Wales; Jary David Jensen; Peter Lamont, both of Midland, Mich.

[73] Assignee: Dow Corning Corporation, Midland, Mich.

[21] Appl. No.: 707,259

[22] Filed: Sep. 3, 1996

[51] Int. Cl.$^6$ ........................................................ C08K 9/00
[52] U.S. Cl. .......................... 523/209; 523/212; 524/267; 524/268; 524/731; 528/15; 525/478
[58] Field of Search .................................... 524/267, 268, 524/731; 523/209, 212; 528/15; 525/478

[56] References Cited

U.S. PATENT DOCUMENTS

| | | |
|---|---|---|
| 3,159,601 | 12/1964 | Ashby . |
| 3,220,972 | 11/1965 | Lamoreaux . |
| 3,296,291 | 1/1967 | Chalk . |
| 3,419,593 | 12/1968 | Willing . |
| 3,445,420 | 5/1969 | Kookootsedes et al. . |
| 3,516,946 | 6/1970 | Modic . |
| 3,697,473 | 10/1972 | Polmanteer et al. . |
| 3,814,730 | 6/1974 | Karstedt . |
| 3,884,866 | 5/1975 | Jeram et al. . |
| 3,928,629 | 12/1975 | Chandra et al. . |
| 3,989,668 | 11/1976 | Lee et al. . |
| 4,057,596 | 11/1977 | Takamizawa et al. . |
| 4,753,978 | 6/1988 | Jensen . |
| 5,036,117 | 7/1991 | Chung et al. . |

*Primary Examiner*—Melvyn I. Marquis
*Attorney, Agent, or Firm*—William F. Boley; Jennifer S. Warren

[57] ABSTRACT

A platinum group-metal curing liquid silicone rubber compositions having improved physical properties such as tear and heat-aging, especially at durometers below about 35 and above about 65. The present inventors have unexpectedly discovered that the addition of diorganohydrogensiloxy endblocked polydiorganosiloxanes and triorganosiloxy endblocked polydiorganosiloxanes having a viscosity greater than about 10 Pa•s at 25° C. to liquid silicone rubber compositions can provide for the described improved properties.

29 Claims, No Drawings

USE OF HIGH MOLECULAR WEIGHT ORGANOPOLYSILOXANES TO IMPROVE PHYSICAL PROPERTIES OF LIQUID SILICONE RUBBER COMPOSITIONS

BACKGROUND OF INVENTION

The present invention is platinum group-metal curing liquid silicone rubber compositions having improved physical properties such as tear and heat aging, especially at durometers below about 35 and above about 65. The present inventors have unexpectedly discovered that the addition of diorganohydrogensiloxy end-blocked polydiorganosiloxanes and triorganosiloxy end-blocked polydiorganosiloxanes having a viscosity greater than about 10 Pa•s at 25° C. to liquid silicone rubber compositions can provide for the described improved properties.

Polmanteer et al., U.S. Pat. No. 3,967,473, describe a composition which is fluid and consists essentially of a polydiorganosiloxane having two vinyl radicals per molecule and terminated with triorganosiloxy groups, a mixture of silicone compounds containing silicon-bonded hydrogen atoms, a platinum catalyst, and optionally a reinforcing silica. The cured elastomers prepared from the compositions described by Polmanteer et al. can have a low durometer, but typically the tear strength is poor and below about 26 kN/m (150 ppi). In addition, the compositions described by Polmanteer et al. are unsuitable for making high durometer silicone elastomers with good tear strength and heat stability.

Jeram et al., U.S. Pat. No. 3,884,866, discloses curable organosiloxane compositions having improve physical properties which comprises (A) a high viscosity component containing vinyl-terminated polydiorganosiloxane having a viscosity of from 5 Pa•s to 1,000 Pa•s at 25° C., and (B) a low viscosity component containing at least one polydiorganosiloxane having a viscosity of from 0.05 Pa•s to 5 Pa•s at 25° C. The curable compositions also contain an organohydrogensiloxane crosslinker and a platinum hydrosilation catalyst.

Jensen, U.S. Pat. No. 4,753,978, teaches that the tear strength of platinum curable liquid silicone rubbers as described by Jeram et al., supra, can by improved if the compositions contain a mixture of two liquid diorganovinylsiloxy terminated polydiorganosiloxanes. One of the diorganovinylsiloxy terminated polydiorganosiloxanes comprises 70 to 95 percent by weight of the mixture and contains vinyl or other ethylenically unsaturation hydrocarbon radicals only at the terminal positions and has a viscosity of from 20 Pa•s to 200 Pa•s at 25° C. The second polydiorganosiloxane contains both terminal vinyl radicals and from 1 to 5 mole percent of vinyl radicals on non-terminal repeating units and has a viscosity of from 0.1 Pa•s to 200 Pa•s at 25° C. Although the compositions taught by Jensen, supra, cure to form elastomers having excellent tear strength at durometers above about 35, the tear strength tends to deteriorate at lower durometers and is typically less than about 26 kN/m (150 ppi). Furthermore, the cured compositions taught by Jensen, supra, at durometers above about 65 have poor heat aging properties, tending to become brittle.

Takamizawa et al., U.S. Pat. No. 4,057,596, teach an anti-sticking silicone compositions comprising (a) a polydiorganosiloxane of substantially straight-chain molecular structure having dimethylvinylsiloxy terminal groups at both ends and preferably having a viscosity within a range of 0.05 Pa•s to 5 Pa• at 25° C., (b) a polydiorganosiloxane of substantially straight-chain structure having dimethylhydrogensiloxy groups at both chain ends and a preferred viscosity of 0.002 Pa•s to 0.1 Pa•s at 25° C., (c) a polymethylvinylsiloxane having at least three vinyl groups bonded to the silicon atoms in one molecule, (d) a polymethylhydrogensiloxane having at least three hydrogen atoms bonded directly to the silicon atoms in one molecule, and (e) an addition reaction catalyst.

SUMMARY OF INVENTION

The present invention is platinum group-metal curing liquid silicone rubber compositions having improved physical properties such as tear and heat aging, especially at durometers below about 35 and above about 65. The present inventors have unexpectedly discovered that the addition of diorganohydrogensiloxy end-blocked polydiorganosiloxanes and triorganosiloxy end-blocked polydiorganosiloxanes having a viscosity greater than about 10 Pa•s at 25° C. to liquid silicone rubber compositions can provide for the described improved properties.

DESCRIPTION OF INVENTION

The present invention is a platinum group-metal curing liquid silicone rubber composition having improved physical properties, especially tear strength, tensile strength, and resistance to heat aging. The compositions are especially useful for forming cured silicon elastomers with durometers in the range of about 15 to 35 and above about 65. All durometers values hereinafter are those as determined by ASTM D2240 (Shore A). The present platinum-group metal curing liquid silicone rubber composition comprises:

(A) 35 to 75 weight percent, based on the weight of the composition, of a diorganoalkenylsiloxy terminated polydiorganosiloxane having a viscosity within a range of about 20 Pa•s to 200 Pa•s at 25° C. and containing essentially no ethylenically unsaturated hydrocarbon radicals bonded to non-terminal silicon atoms, (B) 0 to 30 weight percent, based on the weight of the composition of a diorganoalkenylsiloxy terminated polydiorganosiloxane having a viscosity within a range of about 0.1 Pa•s to 200 Pa•s at 25° C., where from 1 to about 5 percent of the non-terminal repeating units of the diorganoalkenylsiloxy terminated polydiorganosiloxane comprise an alkenyl radical, (C) 1 to 30 weight percent, based on the weight of the composition, of a polydiorganosiloxane described by formula $R^1_2R^2SiO(R^1R^2SiO)_xOSiR^1_2R^2$, where each $R^1$ is independently selected from a group consisting of saturated monovalent hydrocarbon radicals and aryl radicals, each $R^2$ is independently selected from a group consisting of hydrogen, $R^1$, and alkenyl radicals with the proviso that $R^2$ comprise no more than one alkenyl radical per polydiorganosiloxane molecule, and x is a value such that the polydiorganosiloxane has a viscosity greater than about 10 Pa•s at 25° C., (D) 5 to 40 weight percent, based on the weight of the composition of a treated reinforcing silica filler, (E) an amount sufficient to cure the composition of an organohydrogensiloxane crosslinker, and (F) a platinum group metal-containing catalyst in an amount sufficient to effect curing of the composition.

Component (A) of the present composition is a diorganoalkenylsiloxy end-blocked polydiorganosiloxane having a viscosity within a range of about 20 Pa•s to 200 Pa•s at 25° C. and containing essentially no ethylenically unsaturated hydrocarbon radicals bonded to non-terminal silicon atoms. Component (A) of the present composition can be described by formula $R^5R^3_2SiO(R^4_2SiO)_mSiR^3_2R^5$, where $R^3$ and $R^4$ are independently selected saturated monovalent hydrocarbon radicals comprising about one to 20 carbon atoms, each $R^5$ is an independently selected alkenyl radical comprising 2 to about 12 carbon atoms, and m represents a degree of polymerization equivalent to a viscosity of about 20 Pa•s to 200 Pa•s at 25° C. Preferred is when m represents a degree of polymerization equivalent to a viscosity of about 40 Pa•s to 70 Pa•s at 25° C. Component (A) contains essentially no ethylenically unsaturated hydrocarbon radicals bonded to non-terminal silicon atoms. By the term "essentially no ethylenically unsaturated hydrocarbon radicals bonded to non-terminal silicon atoms," it is meant that the only ethylenically unsaturated hydrocarbon radicals present on the non-terminal silicon atoms of component (A) results from impurities present in the reactants used to prepare component (A) or from undesired rearrangements occurring during the preparation of component (A).

In component (A), it is preferred that $R^3$ be an alkyl comprising about one to four carbon atoms. Most preferred is when all of the $R^3$ substituents of component (A) are methyl.

In component (A) it is desirable that at least one of the $R^4$ radicals substituted on the non-terminal silicon atoms be an alkyl comprising about 1 to 4 carbon atoms, preferably methyl. The other $R^4$ radicals substituted on the non-terminal silicon atoms can be alkyls such as methyl or ethyl, substituted alkyls such a chloromethyl, 3-chloropropyl, or 3,3,3-trifluoropropyl; cycloalkyls such as cyclopentyl or cyclohexyl; or aryls such as phenyl, xylyl, tolyl, and naphthyl. In component (A), it is preferred that any $R^3$ radical other than methyl be selected from a group consisting of phenyl and 3,3,3-trifluoropropyl.

In component (A), $R^5$ can be, for example, vinyl, allyl, and hexenyl. The preferred component A is one in which $R^5$ is vinyl.

The preferred component (A) is a dimethylvinylsiloxy end-blocked polydimethylsiloxane having a viscosity within a range of about 40 Pa•s to 70 Pa•s at 25° C. Preferred is when component (A) comprises about 50 to 60 weight percent of the composition.

The present composition can comprise about 0 to about 30 weight percent, based on the weight of the composition of a diorganoalkenylsiloxy terminated polydiorganosiloxane (component (B)) having a viscosity within a range of about 0.1 Pa•s to 200 Pa•s at 25° C., where from one to about 5 percent of the non-terminal repeating units of the diorganoalkenylsiloxy terminated polydiorganosiloxane comprise an alkenyl radical. Component (B) of the present composition may be described by formula

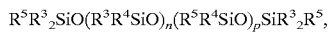

where $R^3$, $R^4$, and $R^5$ are as previously described, the degree of polymerization represented by the sum of n and p is equivalent to a viscosity of about 0.1 Pa•s to 200 Pa•s at 25° C. and the ratio of p/(n+p) is within a range of about 0.01 to 0.05. It is preferred that the degree of polymerization of component (B) be less than that of component (A) and the viscosity be within a range of about 0.1 Pa•s to 20 Pa•s at 25° C.

Component (B) is optional in the present composition, but when required as much as 30 weight percent of component (B), based on the weight of the composition, may be added. As taught in Jensen, U.S. Pat. No. 4,753,978, diorganoalkenylsiloxy end-blocked polydiorganosiloxanes within the scope of component (B) when combined with diorganoalkenylsiloxy end-blocked polydiorganosiloxanes within the scope of component (A) may provide for compositions having improved physical properties, such as tear, when cured. Generally, if component (B) is to be added to the present composition it is preferred that component (B) comprise about 5 to 30 weight percent of the composition. More preferred, when component (B) is added to the composition, is when component (B) comprises about 5 to 15 weight percent of the composition.

The present composition requires the presence of 1 to 30 weight percent of component (C) which is a polydiorganosiloxane described by formula $R^1_2R^2SiO(R^1R^2SiO)_xOSiR^1_2R^2$. Preferred is when component (C) comprises 10 to 20 weight percent of the composition.

In the formula for component (C), each $R^1$ is independently selected from a group consisting of saturated monovalent hydrocarbon radicals and aryl radicals, each $R^2$ is independently selected from a group consisting of hydrogen, $R^1$, and alkenyl radicals with the proviso that $R^2$ comprise no more than one alkenyl radical per polydiorganosiloxane molecule, and x is a value such that the polydiorganosiloxane has a viscosity greater than about 10 Pa•s at 25° C. Preferred is when $R^1$ is a saturated monovalent hydrocarbon radical comprising one to about 12 carbon atoms. $R^1$ can be an unsubstituted or substituted saturated monovalent hydrocarbon radical. $R^1$ can be, for example, an alkyl such as methyl and ethyl; a cycloalkyl such as cyclopentyl and cyclohexyl; a substituted alkyl such as chloromethyl, 3-chloropropyl, and 3,3,3-trifluoropropyl; and an aryl such as phenyl, xylyl, tolyl, and naphthyl. In one preferred embodiment of the present composition, it is preferred that each $R^1$ be methyl.

Each substituent $R^2$ is independently selected from a group consisting of hydrogen, $R^1$ as defined above, and alkenyl radicals. $R^2$ can be, for example, an alkenyl radical comprising one to about 12 carbon atoms such as vinyl, allyl, and hexenyl. Preferred is when each $R^2$ is independently selected from a group consisting of hydrogen, methyl, and vinyl with the proviso that only one $R^2$ in each organopolysiloxane molecule can be vinyl. In the formula describing component (C), x is a value such that the polydiorganosiloxane has a viscosity greater than about 10 Pa•s at 25° C. Preferred is when x is a value such that component (C) has a viscosity greater than about 20 Pa•s at 25° C. Even more preferred is when x is a value such that component (C) has a viscosity greater than the viscosity of the component (A) present in the composition. The upper limit for the value of x is not limiting and can generally be a value such that component (A) has a viscosity up to 1,000 Pa•s or greater. The only limitation on the value of x is that the viscosity of component (C) be such that it can be blended into component (A). It is preferred that x be a value such that component (C) has a viscosity within a range of about 60 Pa•s to 1000 Pa•s at 25° C.

Examples of polydiorganosiloxanes useful as component (C) in the present compositions include trimethylsiloxy end-blocked polydimethylsiloxane, dimethylhydrogensiloxy end-blocked polydimethylsiloxane, and polydimethylsiloxane end-blocked on one end with a dimethylhydrogensiloxy group and on the other end with a dimethylvinylsiloxy group.

The present inventors have unexpectedly found that the addition of component (C) to the present composition provides for a liquid silicone rubber composition with improved physical properties when cured. The present composition is especially useful as a liquid silicone rubber composition which can be cured to form elastomers having a durometer within a range of about 15 to 35 and elastomers having durometers above about 65. The present liquid silicone rubber compositions can be cured to form silicone elastomers having improved physical properties such as tear, tensile, and heat resistance. Therefore, a preferred composition when cured forms a silicone elastomer having a durometer within a range of about 15 to 35. More preferred is a composition which cures to form a silicone elastomer having a durometer within a range of about 20 to 30. Other preferred compositions are those which cure to have a durometer about 65. More preferred as those compositions which cure to have a durometer within a range of about 70 to 80.

The present composition comprises 5 to 40 weight percent, based on the weight of the composition, of a treated reinforcing silica filler. Preferred is when the present composition comprises about 10 to 30 weight percent of the treated reinforcing silica filler, based on the weight of the composition. The reinforcing silica filler can be any of those known in the art to be useful for the reinforcement of organosiloxane compositions. Preferred is when the reinforcing silica filler is a precipitated or fumed silica, with fumed silica being most preferred. It is preferred that the treated reinforcing silica filler have a BET surface area greater than about 50 $m^2/g$. More preferred is when the reinforcing silica filler is a fumed silica having a BET surface area within a range of about 200 $m^2/g$ to 500 $m^2/g$. Most preferred is when the reinforcing silia filler has a BET surface area within a range of about 250 $m^2/g$ to 400 $m^2/g$.

The reinforcing silica filler is "treated" with one or more of the silica treating agents known to improve the reinforcing function of the silica and to prevent the phenomenon typically referred to as "creping" or "crepe harding" which can occur during the storage of such compositions. The silica treating agent can be any of the low molecular weight organosilicon compounds disclosed in the art as being suitable as such a treating agent. The treating agents are typically liquid hydroxy terminated polydiorganosiloxanes containing an average of about 2 to 20 repeating units per molecule and organosilicon compounds such as hexaorganodisiloxanes and hexaorganodisilazanes that hydrolyze under the conditions used to treat the silica. For the present compositions, a preferred silica treating agent is selected from a group consisting of hexamethyldisilazane, sym-tetramethyldivinyldisilazane and hydroxy-terminated polydimethylsiloxanes comprising about 8 repeating units.

The treated reinforcing silica filler may be treated with one or more treating agents prior to addition to the present composition or may be treated in situ. By "in situ" it is meant that the reinforcing silica filler is treated with the treating agent in the presence of at least a portion of component (A), component (B), or a mixture thereof. Preferred is when the reinforcing silica filler is treated in situ.

The present composition requires an amount sufficient to cure the composition of an organohydrogensiloxane crosslinker. The organohydrogensiloxanes useful as crosslinker in the present composition are well known in art and are described, for example, by Polmanteer et al., U.S. Pat. No. 3,967,473; Lee et al., U.S. Pat. No. 3,989,668; and Jensen, U.S. Pat. No. 4,753,978, which patents are hereby incorporated by reference to show examples of useful organohydrogensiloxanes known in the art. The organohydrogensiloxanes useful in the present compositions can be any organohydrogensiloxanes having an average of at least three silicon-bonded hydrogen atoms per molecule and an average of no more than one silicon-bonded hydrogen atom per silicon atom. The remaining valences of the silicon atoms are satisfied by divalent oxygen atoms and monovalent hydrocarbon atoms such as methyl, vinyl, and phenyl. The organohydrogensiloxanes can be homopolymers, copolymers, and mixtures thereof which can contain for example diorganosiloxy units, organohydrogensiloxy units, triorganosiloxy units and $SiO_2$ units. The organohydrogensiloxanes can be linear, cyclic, and branched polymers and copolymers. Specific examples of organohydrogensiloxanes useful in the present compositions include polymethylhydrogensiloxane cyclics, polymethylhydrogensiloxanes end-blocked with dimethylhydrogensiloxy units or trimethylsiloxy units, and copolymers comprised of dimethylsiloxy units and methylhydrogen siloxy units end-blocked with dimethylhydrogensiloxy units or trimethylsiloxy units.

The amount of the organohydrogensiloxane useful in the present composition is that sufficient to effect cure of the composition to a silicone rubber. Generally, a useful amount of organohydrogensiloxane is that sufficient to provide a ratio of silicon-bonded hydrogen atoms to alkenyl substituents provided by component (A) and (B) within a range of about 1:10 to 10:1. Preferred is where the ratio of silicon-bonded hydrogen atoms provided by the organohydrogensiloxane to alkenyl substituents of component (A) and component (B) is within a range of about 1:1 to 3:1. Even more preferred is where the ratio of silicon-bonded hydrogen atoms provided by the organohydrogensiloxane to alkenyl substituents of component (A) and component (B) is within a range of about 1.7:1 to 2:1.

The present composition comprises a platinum group metal-containing catalyst in an amount sufficient to promote curing of the composition. The platinum group metal-containing catalyst can be any such catalyst which is known to catalyze the reaction of silicon-bonded hydrogen atoms with silicon-bonded alkenyl groups. By "platinum group metal" it is meant ruthenium, rhodium, palladium, osmium, iridium, and platinum. A group of platinum group metal-containing catalysts particularly useful in the present compositions are the complexes prepared from chloroplatinic acid as described by Willing, U.S. Pat. No. 3,419,593, hereby incorporated by reference as teaching such complexes and their preparation. A preferred catalyst is a platinum-containing complex which is the neutralized reaction product of chloroplatinic acid and sym-divinyltetramethyldisiloxane. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946, Karstedt, U.S. Pat. No. 3,814,730; and Chandra et al., U.S. Pat. No. 3,928,629 all of which are hereby incorporated by reference to show useful platinum group metal-containing catalysts and methods for their preparation.

The amount of platinum group-metal containing catalyst useful in effecting curing of the present composition is not narrowly limited as long as there is a sufficient amount present to accelerate a reaction between the silicon-bonded hydrogen atoms of the organohydrogensiloxane crosslinker and the vinyl substituents of components (A) and (B). The appropriate amount of the platinum group metal containing catalyst will depend upon the particular catalyst used. In general as low as about 0.001 part by weight of platinum group metal for every million parts (ppm) by weight of the present composition may be useful. Preferably the amount of platinum group metal is at least about 1 ppm on the same basis. More preferred is at least about 1 ppm to about 10,000 ppm platinum group metal, on the same basis.

The present composition may cure rapidly at room temperature. To hinder this curing process an inhibitor may optionally be added to the composition. The inhibitor can be any of those materials known to inhibit the catalytic activity of platinum group metal-containing catalysts. By the term "inhibitor" it is meant a material that retards the room temperature curing of the composition when incorporated in the composition at less than about 10 weight percent of the composition, without preventing the elevated temperature curing of the composition.

Inhibitors of platinum group metal-containing catalysts are well known in the organosilicon art. A preferred class of inhibitors useful in the present composition are acetylenic alcohols as described in Kookootsedes et al., U.S. Pat. No. 3,445,420, which is incorporated herein by reference. Such acetylenic alcohols are exemplified by 1-ethynyl-1-cyclohexanol and 2-methyl-3-butyn-2-ol. Other examples of classes of inhibitors which may be useful in the present compositions are described in Chung et al., U.S. Pat. No. 5,036,117, which is hereby incorporated by reference for such teachings.

The amount of inhibitor useful in the present composition is not critical and can be any amount that will retard the platinum group metal catalyzed reaction of the hydrogen atoms of the organohydrogensiloxane with the vinyl substituents of components (A) and (B), while not preventing the reaction at elevated temperatures. The specific amount of inhibitor used will depend upon the particular inhibitor, the concentration and type of catalyst, and the nature and amounts of components (A) and (B) and the organohydrogensiloxane crosslinker. Generally, when an inhibitor is used it is preferred that at least one mole of inhibitor be present for each mole of platinum group metal in the composition and that the inhibitor not exceed one weight percent of the composition.

The present composition may contain other components such as mold release agents, colorants, heat stabilizers, and electrically conductive materials as long as the physical properties of the composition are not unsatisfactorily impacted.

The present composition can be formed from a two-part system which can cure upon mixing and being subjected to an appropriate temperature. For example, two equal portions comprising components (A), (B), and (C) can be formed and component (D) the organohydrogensiloxane added to one portion to form a part A and component (E) the platinum group metal-containing catalyst added to the second portion to form a part B. The present composition can then be formed by combining Part A and Part B. In addition, a platinum group metal catalyst inhibitor may be added to part A.

The following examples are provided to illustrate the present invention. The examples are not intended to limit the scope of the present claims.

EXAMPLES

Cured silicone elastomers were prepared from the components described in Table 1 at the concentrations described in Table 2. Generally, the compositions described in Table 2 were prepared by adding all or a portion of component (A) to a blender, adding the silica, and then adding about 20 weight percent based on the weight of the silica of hexamethyldisilazane, and sufficient water to effect hydrolysis of the hexamethyldisilazane. After sufficient mixing to ensure treatment of the filler with the hexamethyldisilazane, the mixture was heated to about 160° C. under vacuum for a period of time sufficient to drive off volatile materials. The mixture was cooled and, when present, components (B), (C1), and (C2) blended into the mixture. The crosslinker, component (E), was added to the mixture at a concentration providing about 1.7 to 2.0 moles of silicon-bonded hydrogen per mole of vinyl provided to the composition by components (A) and (B). The catalyst composition, component (F), was added to the composition at a concentration sufficient to provided about 8 ppm platinum, and 1-ethynyl-1-cyclohexanol was added to the composition at a concentration of about 0.05 parts per 100 parts of components (A) and (B). The resulting compositions were cured at 150° C. for ten minutes to form test samples for physical properties testing. Additional cured samples were post-cured at 200° C. for four hours for physical properties testing.

The physical properties of the cured elastomers were tested by the following methods: Durometer (Shore A), ASTM D2240; Tear B, ASTM D625; Tensile, 100% Modulus, and Elongation, ASTM D412; and Compression Set (Comp. Set), ASTM D395 (22 h at 177° C.). The extrusion rates of the uncured compositions were testing by extruding the compositions through a die having a 3.2 mm diameter orifice at a pressure of 0.62 MPa (90 psi). The results of the physical properties testing are provided in Table 3 and Table 4.

For comparison purposes physical properties of 20 durometer and a 30 durometer liquid silicone rubber compositions commercially available from Dow Corning Corporation (Midland, Mich.) that do not contain the high molecular weight component (C) of the present composition are provided in Table 5.

TABLE 1

Description of Composition Components

| Component | Description |
| --- | --- |
| A | Dimethylvinylsiloxy end-blocked polydimethylsiloxane having a viscosity of 55 Pa · s at 25° C. |
| B | Dimethylvinylsiloxy end-blocked polydimethylsiloxane having pendant vinyl substitution, total vinyl substitution on silicon of 2 mole %, and a viscosity of 0.3 Pa · s at 25° C. |
| C1 | Trimethylsiloxy end-blocked polydimethylsiloxane having a viscosity of 60 Pa · s at 25° C. |
| C2 | Dimethylhydrogensiloxy end-blocked polydimethylsiloxane having a viscosity of 60 Pa · s at 25° C. |
| D | Fumed silica having a BET surface area of 400 m$^2$/g and treated with hexamethyldisilazane. |
| E | Trimethylsiloxy end-blocked copolymer comprising dimethylsiloxy units and methylhydrogensiloxy units having 0.8 weight percent hydrogen bonded to silicon and a viscosity of 16 mPa · s at 25° C. |
| F | Platinum catalyst comprising the neutralized reaction product of chloroplatinic acid with sym-tetramethyldivinyldisiloxane. |

TABLE 2

Description of Test Compositions

| | Weight Parts Composition number | | | | | |
| --- | --- | --- | --- | --- | --- | --- |
| Component | 1 | 2 | 3 | 4 | 5 | 6 |
| A | 70 | 70 | 70 | 70 | 70 | 70 |
| B | 0 | 10 | 20 | — | 10 | 20 |
| C1 | — | — | — | 30 | 20 | 10 |
| C2 | 30 | 20 | 10 | — | — | — |

TABLE 2-continued

Description of Test Compositions

| | Weight Parts Composition number | | | | | |
|---|---|---|---|---|---|---|
| Component | 1 | 2 | 3 | 4 | 5 | 6 |
| E | * | * | * | * | * | * |
| F | ** | ** | ** | ** | ** | ** |

*Component E was added in an amount providing a ratio of silicon-bonded hydrogen atoms to vinyl within a range of 1.7 to 2.
**Component F was added in an amount sufficient to provide a final concentration of platinum in a range of 7 to 8 ppm.

TABLE 3

Physical Properties of Cured Compositions Without Post-Cure

| | Composition Number | | | | | |
|---|---|---|---|---|---|---|
| Physical Property | 1 | 2 | 3 | 4 | 5 | 6 |
| Durometer | 21.2 | 37.7 | 41.1 | 19.1 | 28.4 | 37.6 |
| Tear B, kN/m | 42.7 | 43.6 | 46.7 | 27.8 | 42.5 | 46.0 |
| Tensile, MPa | 8.06 | 7.68 | 7.09 | 8.27 | 8.50 | 7.41 |
| Modulus (100%), MPa | 0.33 | 0.77 | 1.39 | 0.29 | 0.62 | 1.12 |
| Elongation, % | 1009 | 768 | 486 | 951 | 801 | 538 |
| Comp. Set, % | 43 | 56 | 64 | 45 | 46 | 51 |
| Extrusion Rate, g/min | 43 | 43 | 80 | — | — | — |

TABLE 4

Physical Properties of Cured Compositions With Post-Cure

| | Composition Number | | | | | |
|---|---|---|---|---|---|---|
| Physical Property | 1 | 2 | 3 | 4 | 5 | 6 |
| Durometer | 24.8 | 38.8 | 49.3 | 21.2 | 33.3 | 44.8 |
| Tear B, kN/m | 37.5 | 44.1 | 51.3 | 33.3 | 45.3 | 44.6 |
| Tensile, MPa | 8.57 | 7.59 | 7.85 | 9.08 | 8.38 | 7.62 |
| Modulus (100%), MPa | 0.41 | 1.21 | 2.63 | 0.35 | 0.96 | 2.10 |
| Elongation, % | 949 | 660 | 446 | 959 | 751 | 476 |
| Comp. Set, % | 33 | 25 | 21 | 30 | 21 | 19 |

TABLE 5

Physical Properties of Comparison Examples

| Physical Property | Silastic ® 9280-20 | Silastic ® 9280-30 |
|---|---|---|
| Durometer | 20 | 30 |
| Tear B, kN/m | 17.5 | 21.0 |
| Tensile, MPa | 8.27 | 8.27 |
| Elongation, % | 1000 | 850 |

We claim:

1. A platinum group-metal curing liquid silicon rubber composition comprising:
   (A) 35 to 75 weight percent, based on the weight of the composition, of a diorganoalkenylsiloxy end-blocked polydiorganosiloxane having a viscosity within a range of about 20 Pa•s to 200 Pa•s at 25° C. and containing essentially no ethylenically unsaturated hydrocarbon radicals bonded to non-terminal silicon atoms,
   (B) 0 to 30 weight percent, based on the weight of the composition of a diorganoalkenylsiloxy end-blocked polydiorganosiloxane having a viscosity within a range of about 0.1 Pa•s to 200 Pa•s at 25° C., where from 1 to about 5 percent of the non-terminal repeating units of the diorganoalkenylsiloxy end-blocked polydiorganosiloxane comprise an alkenyl radical,
   (C) 1 to 30 weight percent, based on the weight of the composition, of a polydiorganosiloxane described by formula $$R^1{}_2R^2SiO(R^1R^2SiO)_xOSiR^1{}_2R^2,$$

where each $R^1$ is independently selected from a group consisting of saturated monovalent hydrocarbon radicals and aryl radicals, each $R^2$ is independently selected from a group consisting of hydrogen, $R^1$, and alkenyl radicals with the proviso that $R^2$ comprise no more than one alkenyl radical per polydiorganosiloxane molecule and x is a value such that the polydiorganosiloxane has a viscosity greater than about 10 Pa•s at 25° C.,
   (D) 5 to 40 weight percent, based on the weight of the composition, of a treated reinforcing silica filler,
   (E) an amount sufficient to cure the composition of an organohydrogensiloxane crosslinker, and
   (F) a platinum group-metal containing catalyst in an amount sufficient to effect curing of the composition.

2. A composition according to claim 1, where component (A) has a viscosity within a range of about 40 Pa•s to 70 Pa•s at 25° C.

3. A composition according to claim 1, where component (A) is a dimethylvinylsiloxy end-blocked polydimethylsiloxane having a viscosity within a range of about 40 Pa•s to 70 Pa•s at 25° C.

4. A composition according to claim 1, where component (A) comprises about 50 to 60 weight percent of the composition.

5. A composition according to claim 1, where component (B) has a viscosity less than that of component (A) and the viscosity of component (B) is within a range of about 0.1 Pa•s to 20 Pa•s at 25° C.

6. A composition according to claim 1, where component (B) comprises about 5 to 30 weight percent of the composition.

7. A composition according to claim 1, where component (B) comprises about 5 to 15 weight percent of the composition.

8. A composition according to claim 1, where component (C) comprises 10 to 20 weight percent of the composition.

9. A composition according to claim 1, where component (C) has a viscosity greater than about 20 Pa•s at 25° C.

10. A composition according to claim 9, where component (C) has a viscosity greater than the viscosity of component (A).

11. A composition according to claim 10, where component (C) has a viscosity within a range of about 60 Pa•s to 1000 Pa•s at 25° C.

12. A composition according to claim 1, where component (C) is selected from a group consisting of trimethylsiloxy end-blocked polydimethylsiloxane and dimethylhydrogensiloxy end-blocked polydimethylsiloxane.

13. A composition according to claim 1 which cures to form a silicone elastomer having a durometer within a range of about 15 to 35 durometer points.

14. A composition according to claim 1 which cures to form a silicone elastomer having a durometer within a range of about 20 to 30 durometer points.

15. A composition according to claim 1 which cures to form a silicone elastomer having a durometer above about 65 durometer points.

16. A composition according to claim 1 which cures to form a silicone elastomer having a durometer within a range of about 70 to 80 durometer points.

17. A composition according to claim 1 comprising 10 to 30 weight percent of component (D).

18. A composition according to claim 1, where the treated reinforcing silica filler comprising component (D) has a BET surface area within a range of about 250 m$^2$/g to 400 m$^2$/g.

19. A composition according to claim 18, where the treated reinforcing silica filler is treated with a treating agent selected from the group consisting of hexamethyldisilazane, sym-tetramethyldivinyldisilazane and hydroxy-terminated polydimethylsiloxanes comprising about 8 repeating units.

20. A composition according to claim 1, where the organohydrogensiloxane crosslinker comprising component (E) is selected from the group consisting of polymethylhydrogensiloxane cyclics, dimethylhydrogensiloxy end-blocked polymethylhydrogensiloxanes, trimethylsiloxy end-blocked polymethylhydrogensiloxanes, copolymers comprising dimethylsiloxy units and methylhydrogensiloxy units end-blocked with dimethylhydrogensiloxy units, and compolymers comprising dimethylsiloxy units and methylhydrogensiloxy units end-blocked with dimethylhydrogensiloxy units.

21. A composition according to claim 1, where the amount of component (E) added to the composition provides a ratio of silicon-bonded hydrogen atoms to alkenyl substituents provided by components (A) and (B) within a range of about 1:10 to 10:1.

22. A composition according to claim 1, where the amount of component (E) added to the composition provides a ratio of silicon-bonded hydrogen atoms to alkenyl substituents provided by components (A) and (B) within a range of about 1:1 to 3:1.

23. A composition according to claim 1, where component (F) is the neutralized reaction product of chloroplatinic acid and sym-divinyltetramethyldisiloxane.

24. A composition according to claim 1, where the platinum group metal containing catalyst comprises platinum as the platinum group metal.

25. A composition according to claim 24 comprising at least about 1 ppm to 10,000 ppm platinum.

26. A composition according to claim 1, where a mixture comprising components (A), (B), and (C) is divided in to two parts and component (D) added to one part and component (E) added to the second part.

27. A composition according to claim 1, where component (C) is trimethylsiloxy end-blocked polydimethylsiloxane having a viscosity within a range of about 60 Pa•s to 1000 Pa•s at 25° C.

28. A composition according to claim 1, where component (C) is dimethylhydrogensiloxy end-blocked polydimethylsiloxane having a viscosity within a range of about 60 Pa•s to 1000 Pa•s at 25° C.

29. A platinum curing liquid silicon rubber composition comprising:

(A) 50 to 60 weight percent, based on the weight of the composition, of a dimethylvinylsiloxy end-blocked polydimethylsiloxane having a viscosity within a range of about 40 Pa•s to 70 Pa•s at 25° C. and containing essentially no ethylenically unsaturated hydrocarbon radicals bonded to non-terminal silicon atoms, (B) 5 to 15 weight percent, based on the weight of the composition, of a dimethylvinylsiloxy end-blocked polydimethyl(methylvinyl)siloxane having a viscosity within a range of about 0.1 Pa•s to 20 Pa•s at 25° C., where from 1 to about 5 percent of the non-terminal repeating units of the dimethylvinylsiloxy end-blocked polydimethyl(methylvinyl)siloxane comprise a vinyl radical, (C) 10 to 20 weight percent, based on the weight of the composition, of a polydiorganosiloxane selected from the group consisting of trimethylsiloxy end-blocked polydimethylsiloxane and dimethylhydrogensiloxy end-blocked polydimethylsiloxane where the polydiorganosiloxane has a viscosity within a range of about 60 Pa•s to 1000 Pa•s at 25° C., (D) 10 to 30 weight percent, based on the weight of the composition, of a treated reinforcing silica filler having a BET surface area within a range of about 200 m$^2$/g to 500 m$^2$/g.

(E) an organohydrogensiloxane crosslinker providing a ratio of silicon-bonded hydrogen atoms to vinyl substituents of components (A) and (B) within a range of about 1.7:1 to 2:1.

(F) a neutralized reaction product of chloroplatinic acid and sym-tetramethyldivinyldisiloxane providing about 1 ppm to 10,000 ppm platinum.

* * * * *